United States Patent [19]

Smelley et al.

[11] 4,303,532

[45] Dec. 1, 1981

[54] DEWATERING OF SLIMES

[75] Inventors: Annie G. Smelley, Northport; Robert W. Montgomery, Tuscaloosa; Bobby J. Hamner, Northport, all of Ala.

[73] Assignee: The United States of America as represented by the Secretary of the Interior, Washington, D.C.

[21] Appl. No.: 923,837

[22] Filed: Jul. 12, 1978

[51] Int. Cl.³ .................................................. C02F 1/56
[52] U.S. Cl. .................................... 210/732; 210/738; 210/907
[58] Field of Search ............... 210/42 R, 49, 51, 54 R, 210/52, 53, 78, 73 R, 77, 54 C, 54 A

[56] References Cited

U.S. PATENT DOCUMENTS

| 3,020,231 | 2/1962 | Colwell et al. | 210/54 R |
|---|---|---|---|
| 3,423,313 | 1/1969 | Messer | 210/73 R |
| 3,630,893 | 12/1971 | Tanaka et al. | 210/49 |
| 3,904,520 | 9/1975 | Dancy | 210/52 |
| 3,956,116 | 5/1976 | Brandt | 210/42 R |
| 4,051,027 | 9/1977 | Batzer et al. | 210/42 R |

Primary Examiner—Benoît Castel
Attorney, Agent, or Firm—William S. Brown; Donald A. Gardiner

[57] ABSTRACT

Efficient dewatering of slimes is achieved by admixing the slimes with a flocculating agent, followed by mechanical manipulation to effect rapid removal of water and consolidation of solids. The required mechanical manipulation may be accomplished, e.g., by tumbling the mixture through a rotating cylindrical screen or by passing it across a vibrating screen.

6 Claims, No Drawings

DEWATERING OF SLIMES

Slimes, of the type treated according to the process of the invention, consist of aqueous suspensions of ultrafine solid materials. Due to the colloidal nature of the suspensions, separation of the solids therefrom is generally very difficult. Disposal of such suspensions in settling ponds is a common practice in many mineral benefication processes. This procedure, however, requires large retention ponds and very long settling periods, sometimes several years.

As disclosed in U.S. Pat. No. 3,932,275, addition of a variety of flocculating or coagulating agents has been employed for the purpose of increasing speed and efficiency of dewatering of slimes. In addition, the prior art, e.g., U.S. Pat. No. 3,606,947 and No. 3,630,893, discloses separation or extraction of solid matter from suspension in a liquid by addition of a flocculating agent, followed by treatment in a rotating cylindrical vessel to transform the solid matter into granular, cake or pellet form. However, these prior art processes generally do not provide sufficiently rapid and efficient dewatering of slimes for particular purposes, as more fully discussed below.

Applicants have now found, according to the process of the invention, that efficient dewatering of slimes may be achieved by admixing the slimes with a flocculating agent for a time sufficient to form flocs of adequate size, followed promptly by mechanical manipulation of the resulting mixture by means causing dynamic movement, and resulting consolidation, of solids, as well as rapid and simultaneous removal and separation of water. Such a process has been found to generally yield a dewatered product having a solids content of about 20 to 40 percent as compared to about 1 to 5 percent solids in the original slimes. In addition, the dewatered product consists of a readily-handled coherent plastic mass, resulting from consolidation of solids, rather than a non-coherent mass of settled flocs which is typical of many prior art products. Since the aqueous component of the slimes may comprise soluble materials, such as those discussed below, the term "water" as used herein will be understood to include such aqueous compositions.

The process of the invention has been found to be particularly effective in treatment of phosphate slimes, i.e., slimes resulting from processing of phosphate ores, and the invention will be described in detail with reference to such materials. However, the invention is not limited to treatment of phosphate slimes, but may be applied to dewatering of any slimes, or related materials consisting essentially of aqueous suspensions of ultrafine solids. Moreover, the water, or aqueous, component of the slimes may be a more valuable product than the solids. An example of this occurs in commercial concentration of KCl where a saturated brine containing gangue clay is a waste product. Recovery of the brine, free of the gangue clay, allows full reuse of the saturated brine which contains a considerable amount of valuable KCl. However, conventional methods are capable of separating only a limited amount of the clay from the brine, and the brine is rejected as waste when clay removal is insufficient to permit reuse of the brine. Flocculation dewatering of such brines by means of the process of the invention has, however, been used to effectively separate the clay and allow reuse of a clarified brine.

Another example of application of the process of the invention for removal of an aqueous component from suspended solids is in separation of leached solids from aluminum chloride leach liquor obtained by leaching aluminum from kaolin with hydrochloric acid. Such a procedure may employ the flocculation dewatering process of the invention in stages for countercurrent extraction and recycle of aluminum chloride leach liquor.

The slimes are initially admixed, according to conventional procedures, with a flocculating agent in an amount sufficient to effect coagulation of the fine solid particles to form flocs of a size sufficient for fairly rapid settling. The preferred flocculating agent is polyethylene oxide of a molecular weight of about 1 million or greater, e.g., about 4 to 5 million, although other coagulating agents such as partially hydrolyzed polyacrylamide polymers of molecular weights of several million may also be used. Optimum amounts of the flocculating agent may vary considerably with the specific type of slimes and flocculating agent and are best determined experimentally. However, it has generally been found that amounts of the preferred flocculating agent, polyethylene oxide, of about 0.025 to 0.15 weight percent based on the solids content of the slimes gives good results. Ambient conditions of temperature and pressure are satisfactory and generally preferred. The time required for coagulation of the fine solid particles to form flocs of suitable size will also vary with specific slimes and flocculating agents, but a period of about 2 to 30 seconds is generally sufficient.

The resulting mixture, consisting essentially of flocs and water, is then promptly subjected to a mechanical manipulation whereby water is rapidly removed and separated from the flocs and, simultaneously, consolidation of the flocs results in formation of a coherent plastic mass. Prompt and rapid removal and separation of water has been found to be essential to formation of the low water content, coherent plastic mass typical of the solid products of the invention, as well as to efficient recovery of the aqueous component of the slimes. In addition, dynamic movement of the solids has been found to be essential to efficient liberation and removal of water, as well as consolidation of the solids.

It has been found, according to a preferred embodiment of the invention, that the required mechanical manipulation with rapid removal of water may be readily achieved by tumbling the mixture of flocs and water through a rotating, essentially cylindrical and open-ended screen or trommel similar to those conventionally employed for screening or sizing rock, ore or coal. The screen is preferably designed to revolve about an inclined longitudinal axis, with the mixture of flocs and water being introduced at or near the upper end thereof. As the mixture passes through the rotating screen, water is rapidly and efficiently removed through the screen, with the solid product, i.e., the coherent plastic mass resulting from consolidation of the flocs, generally in the form of a "roll" or "sausage", exiting from the lower end of the rotating screen.

Optimum values of the variables involved in the dewatering step, e.g., screen size, dimensions of the cylindrical screen, angle of inclination and speed of rotation of the screen, and feed rate of the mixture of water and flocs may vary widely depending on the specific nature and amount of the slimes, type and amount of flocculating agent employed, etc., and again are best determined experimentally. However, where the process is used to dewater phosphate slimes, and polyethylene oxide is employed as flocculating agent, a screen size of about 48 to 4 mesh and a peripheral speed of rotation of about 6 to 70 feet per minute usually gives good results. Obviously, dimensions, angle of inclination and speed of rotation of the screen must be correlated with the feed rate of the mixture of water and flocs for optimum removal of water and consolidation of solids, but this is readily accomplished experimentally.

The invention will now be more specifically illustrated by means of the following specific example in which a rotating trommel is used for dewatering. The invention is not, however, limited to such an apparatus since the required mechanical manipulation may be performed by any apparatus, e.g., a vibrating screen or a screw classifier, capable of providing the dynamic movement of the solids, with simultaneous dewatering and consolidation of solids.

EXAMPLE

A phosphate slime containing 5 percent solids was treated by addition, with stirring, of 0.25 percent aqueous polyethylene oxide (m.w.=5 million) at a dosage rate of 1.5 pounds per ton of solids. After a retention time of about 5 seconds, the resulting mixture of water and flocs was fed at a rate of 15 gpm to the upper end of a rotating inclined (about 3 degree inclination) 16.5 - foot long by 20-inch diameter cylindrical screen having a mesh size of 10 and a peripheral speed of rotation of 36 feet per minute. The procedure resulted in rapid dewatering with discharge of a highly consolidated solids product, of water content of 77 percent, from the lower end of the rotating screen.

We claim:

1. A process for dewatering of slimes consisting essentially of:
   admixing the slimes with an amount of flocculating agent sufficient to effect coagulation of the solids in the slimes,
   retaining the slimes-flocculating agent mixture for a time sufficient to form flocs of a size sufficient for moderately rapid settling,
   thereafter promptly introducing the resulting mixture of water and flocs into an inclined rotating cylindrical screen, thereby causing dynamic movement of solids, with resulting consolidation of solids, and rapid and simultaneous removal and separation of water, and
   separately collecting the resulting water and the dewatered and consolidated solids.

2. The process of claim 1 in which the slimes consist essentially of phosphate slimes.

3. The process of claim 1 in which the slimes consist essentially of a brine containing ganque clay.

4. The process of claim 1 in which the slimes consist essentially of leach liquor and residue from hydrochloric acid leaching of kaolin.

5. The process of claim 1 in which the flocculating agent is polyethylene oxide.

6. The process of claim 1 in which the retention time of the slimes-flocculating agent is about 2 to 30 seconds.

* * * * *